March 15, 1966  D. L. ENSLEY  3,240,049
MEASUREMENT OF SPHERICAL STANDING WAVES
Filed July 29, 1963

DONALD LUTHER ENSLEY
INVENTOR.

BY

United States Patent Office 3,240,049
Patented Mar. 15, 1966

3,240,049
MEASUREMENT OF SPHERICAL STANDING WAVES
Donald Luther Ensley, Hurst, Tex., assignor, by direct and mesne assignments, to Harvest Queen Mill & Elevator Company, Dallas, Tex., a corporation of Texas
Filed July 29, 1963, Ser. No. 298,271
3 Claims. (Cl. 73—1)

This invention relates to measurement of ultrasonic acoustic waves and more particularly to a system for measuring the characteristics of spherical standing waves.

In the fabrication of acoustic transducers wherein the field to be produced by the transducers must be carefully controlled as to configuration, it is often desirable to be able to fully evaluate the field produced. The present invention is provided for evaluation of acoustic generators having symmetry with respect to at least one axis and particularly for the determination of the character of a field generated by a hemispherical transducer of ultrasonic frequencies.

In accordance with the invention, there is provided a body having a spherical cavity therein with a base normally maintained horizontal and having an opening extending from the top of the body into the cavity. Means pivotally mounted on the base for rotation about a horizontal axis passing through the center of the cavity has a portion which extends over the opening. A rotatable support extends through the opening into the cavity. The support means includes a transducer mounting means on which a transducer may be secured symmetrical to the horizontal axis of the cavity. An acoustic detector is mounted at a predetermined point in the wall of the cavity and is centered at a point lying in a plane which is perpendicular to the horizontal axis of the cavity and which includes the axis of the support means. Preferably, measuring means are provided to determine the attitude of the transducer with respect to each of the two axes.

Figure 1:
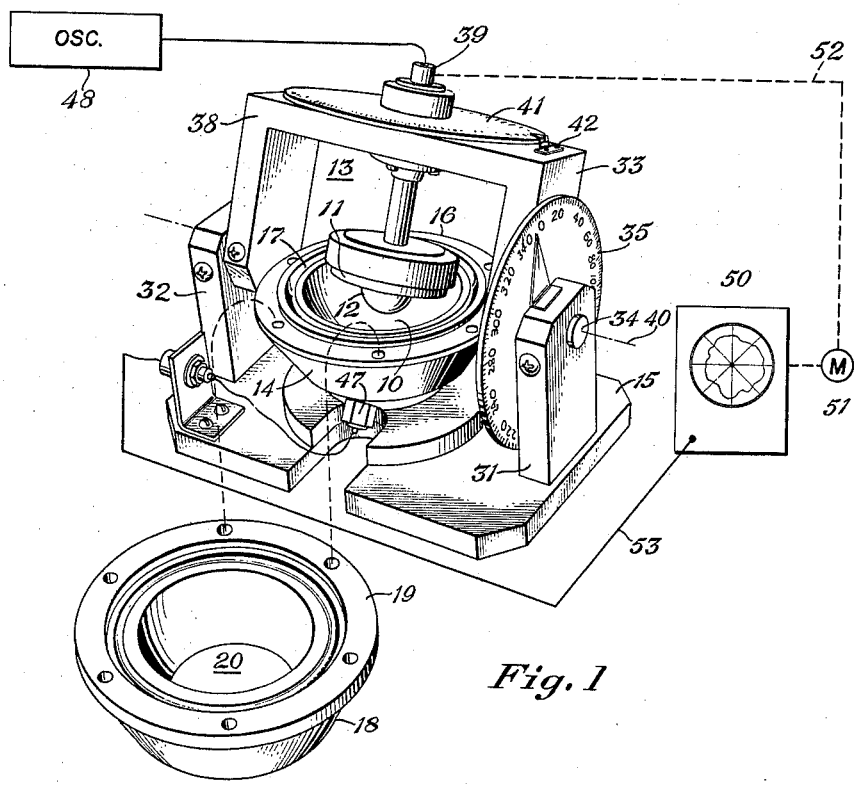
Figure 2:
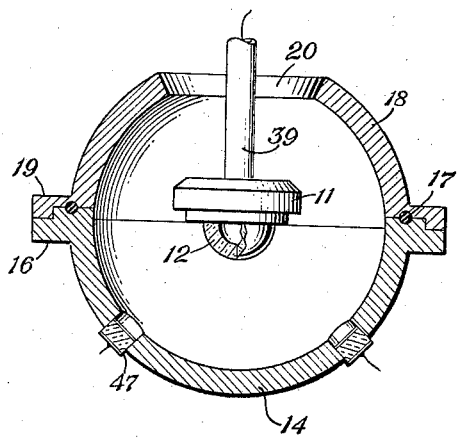

For a more complete understanding of the present invention and for further objects and advantages thereof, reference may now be had to the following description taken in conjunction with the accompanying drawings in which:

FIGURE 1 is a partially disassembled perspective view of the system which embodies the present invention, and FIGURE 2 is a fragmentary sectional view taken along a vertical plane which is perpendicular to the transverse axis of the system of FIGURE 1.

Referring now to FIGURE 1, there is illustrated a system for the measurement of the directional characteristics of standing waves as generated by a hemispherical piezoelectric transducer 12. Transducer 12 is mounted on the face of a mounting plate 11. The transducer 12, as best shown in FIGURE 2, comprises a hemispherical shell of piezoelectric material having conductive electrodes on the inner and outer surfaces thereof. Upon the application of an alternating current voltage between the two electrodes, the transducer radiates acoustic energy at the frequency of the excitation.

In accordance with the present invention, the transducer 12 is mounted in a cavity 10 which is formed inside of a body 13. The body 13 is formed in two parts. The lower half of a spherical portion of the body, and the base portion 14, is mounted on a base plate 15. The plate 15 normally is horizontal. A flange 16 on the base 14 is thus horizontal and upfacing with an O-ring 17 recessed in the surface thereof. The cap 18 is provided with a mating flange 19 in order to be secured to the portion 14. The cap 18 has a central aperture 20 therein. When the cap 18 is bolted onto the base 14, the adjoining walls of the hemispherical cavity are substantially unitary so that a smooth-walled cavity of spherical form is provided.

The plate 15 is provided with a pair of upstanding supports 31 and 32. A bracket 33 is pivotally mounted on supports 31 and 32 as by stub shaft 34. A protractor 35 is mounted on bracket 33 for measurement of the relative rotational position on stub shaft 34 in the bracket 33. A pointer 36 is provided on the support 31 for cooperation with protractor 35. The bracket 33 includes a horizontal beam 38 on which a shaft 39 is mounted. Shaft 39 is rotatably journaled in the beam 38 and includes a protractor 41 which coacts with a pointer 42 for measurement of the rotational position of the shaft 39. The mounting plate 11 is secured to the end of the shaft 39. The face of the mounting plate 11 lies in a plane which includes the axis 40 passing through the stub shaft 34.

An acoustic detector 47 is mounted in the wall of the base 14 in order to detect the acoustic waves generated upon excitation of the crystal 12 from an alternating current source 48.

In practice, the cavity 10 is filled with an acoustic transmission liquid. The transducer 12 is energized from a source 48. The amplitude of the signal detected by detector 47 is then plotted as a function of the rotational position of the shaft 39 for various degrees of inclination of the bracket 33 as it is rotated about the axis 40. The transducer 12 is always maintained centered within the cavity in the housing 13. The walls of the cavity may be made of high impedance material or may be made of low impedance material in order to determine various wave patterns and load conditions upon the transducer.

In accordance with one aspect of the invention, a recorder 50, of the circular chart variety, is driven from a motor 51 which also is coupled as by linkage 52 to the shaft 39. The signal from the detector 47 is applied by way of channel 53 to the recorder 50. As a result, as the motor 51 drives the chart recorder and the shaft 39, a polar plot of the wave pattern produced by excitation of the transducer 12 is obtained. A separate chart may be made for each position of interest of the setting of the protractor 35.

The above-described system is particularly useful in measurement of the radiation pattern of a hemispherical acoustic transducer. The spherical cavity on a base normally maintained horizontal is provided with an opening extending from the top into the cavity. The bracket is pivotally mounted for rotation about a horizontal axis coinciding with a diameter of the cavity and extends over the opening. A support extends from the bracket through the opening and has a transducer mounting plate whose face lies in a plane which includes the above diameter. A high frequency source in the range of from about one-half megacycle to several megacycles is connected to the transducer to produce pressure waves in a transmission fluid in the cavity. Acoustic detectors mounted at predetermined points in the cavity walls are centered at points lying in a plane perpendicular to the bracket axis. Rotation of the bracket is measured along with the output of the detectors.

Having described the invention in connection with certain specific embodiments thereof, it is to be understood that further modifications may now suggest themselves to those skilled in the art, and it is intended to cover such modifications as fall within the scope of the appended claims.

What is claimed is:
1. A fixture for outlining standing wave patterns which comprises:
(a) a body having a spherical cavity therein with a central opening extending into said cavity at the top thereof,
(b) gimbal means supported for rotation about an axis corresponding with a horizontal diameter in said cavity and including a rotatable support extending through said opening along a line which is a perpendicular bisector of said diameter of said cavity lying on said diameter,
(c) means for mounting a hemispherical transducer on said support with the plane of the base of said transducer including said diameter,
(d) detector means in the wall of said body for sensing pressure variations in said cavity, and
(e) means for recording the output of said detector means as a selected function of rotation of one of the gimbal means and said support.

2. A system for determining the radiation pattern of a hemispherical acoustic transducer which comprises:
(a) a body having a spherical cavity therein with a base normally maintained horizontal and with an opening extending through the top of said body into said cavity,
(b) a bracket pivotally mounted on said base for rotation about a horizontal axis passing through the center of said cavity and extending over said opening,
(c) rotatable support means extending from said bracket through said opening and having a transducer mounting plate to which said transducer is secured with the face lying in a plane which includes said axis,
(d) acoustic detector means mounted at a predetermined point in the wall of said cavity centered at a point lying in a plane which is perpendicular to said axis and which includes the axis of said support means, and
(e) means for indicating the rotational position of said bracket about said axis and of said support means relative to said bracket.

3. A fixture for outlining standing wave patterns which comprises:
(a) a body having a spherical cavity therein with a central opening extending into said cavity at the top thereof,
(b) gimbal means supported for rotation about an axis corresponding with a horizontal diameter in said cavity and including a rotatable support extending through said opening along a line which is a perpendicular bisector of said diameter of said cavity lying on said diameter,
(c) a hemispherical transducer mounted on said support with the plane of the base of said transducer including said diameter and having an outer conductive film connected to said body and an inner conductive film,
(d) an alternating current source connected to said inner film through said support for energizing said transducer to produce pressure waves in said cavity,
(e) detector means in the wall of said body for sensing said pressure waves, and
(f) means for recording the output of said detector means as a function of rotation of said gimbal means.

References Cited by the Examiner
UNITED STATES PATENTS 2,918,651 12/1959 Podolak et al. _____ 73—1 X
3,121,211 2/1964 Eskin et al. _____ 73—1 X LOUIS R. PRINCE, *Primary Examiner.*